(12) United States Patent
Miyata et al.

(10) Patent No.: US 8,374,768 B2
(45) Date of Patent: Feb. 12, 2013

(54) INTERNAL COMBUSTION ENGINE CONTROLLER

(75) Inventors: Toshiyuki Miyata, Okazaki (JP);
Katsunori Ueda, Okazaki (JP); Koji Kawakita, Ohbu (JP); Fuminobu Hongoh, Okazaki (JP); Tadashi Ujihara, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 574 days.

(21) Appl. No.: 12/345,061

(22) Filed: Dec. 29, 2008

(65) Prior Publication Data
US 2009/0210134 A1 Aug. 20, 2009

(30) Foreign Application Priority Data

Feb. 15, 2008 (JP) ................. P.2008-035232

(51) Int. Cl.
*B60T 7/12* (2006.01)
*G05D 1/00* (2006.01)
*G06F 7/00* (2006.01)
*G06F 17/00* (2006.01)
*F02B 13/00* (2006.01)
*F02B 43/00* (2006.01)
*F02B 47/00* (2006.01)
*F02M 25/00* (2006.01)

(52) U.S. Cl. .................. 701/103; 123/575; 123/1 A

(58) Field of Classification Search .................. 701/103; 123/672, 679, 1 A, 299, 304, 575, 576, 577, 123/578
See application file for complete search history.

(56) References Cited

U.S. PATENT DOCUMENTS

| | | | | | |
|---|---|---|---|---|---|
| 4,967,714 | A | * | 11/1990 | Inoue | 123/694 |
| 6,758,201 | B2 | * | 7/2004 | Hosoi | 123/679 |
| 7,209,826 | B2 | * | 4/2007 | Abe et al. | 701/109 |
| 2003/0070666 | A1 | * | 4/2003 | Hosoi | 123/672 |

FOREIGN PATENT DOCUMENTS

| | | |
|---|---|---|
| JP | 5-272383 A | 10/1993 |
| JP | 2008-309136 A | 12/2008 |

* cited by examiner

*Primary Examiner* — Stephen K Cronin
*Assistant Examiner* — Sizo Vilakazi
(74) *Attorney, Agent, or Firm* — Birch, Stewart, Kolasch & Birch, LLP

(57) ABSTRACT

A controller of an internal combustion engine operable by an alcohol-containing fuel, includes: an alcohol concentration detecting unit, operable to detect an alcohol concentration of the alcohol-containing fuel; a feedback controller, operable to perform feedback control to make an exhaust air-fuel ratio of the internal combustion engine become equal to a target air-fuel ratio in accordance with an operation region; and an operation region setting unit, operable to set a stoichiometric operation region, in which the target air-fuel ratio is stoichiometric, in an enlarged manner when the alcohol concentration, detected by the alcohol concentration detecting unit, is higher than a concentration.

3 Claims, 10 Drawing Sheets

INTERNAL COMBUSTION ENGINE CONTROLLER

BACKGROUND OF THE INVENTION

1. Field of the Invention

The present invention relates to a controller of an internal combustion engine operable by an alcohol-containing fuel.

2. Description of the Related Art

Gasoline is used as a fuel in an internal combustion engine (engine) of an automobile or other vehicle. Meanwhile, there is a vehicle (FFV: Flexible Fuel Vehicle) in which is installed an engine enabled to use, in addition to gasoline, alcohol as an alternate fuel mixed at any ratio (0% to 100%).

The ratio of gasoline and alcohol (alcohol concentration; blend ratio) of a blended fuel supplied to an engine for FFV is not necessarily constantly fixed. For example, there may be a case where, in a state in which a blended fuel with an alcohol concentration of 80% is stored in a fuel tank of an FFV, a fuel of 0% alcohol concentration (that is, a fuel of 100% gasoline concentration) is supplied or a fuel of 100% alcohol concentration (that is, a fuel of 0% gasoline concentration) is supplied. Normally, the amount supplied also differs each time.

With an engine using a blended fuel, by ascertaining the alcohol concentration in the blended fuel, a fuel injection amount can be adjusted appropriately according to characteristics of the blended fuel. For example, although ethanol, which is an alcohol, is high in octane number, is thus less likely to cause knocking in comparison to alcohol, and has characteristics that are advantageous in terms of thermal efficiency, it is low in energy density, requires a fuel injection amount of 1.3 to 1.5 times that of gasoline, and thus has characteristics that are disadvantageous in terms of fuel consumption.

Due to such circumstances, for example, an art of enlarging a lean feedback region as the alcohol concentration increases and thereby improving the fuel consumption has been known (see JP-A-5-272383). However, from the point of traveling performance, there is a limit as to how much the lean feedback region can be enlarged, and because expansion of a lean operation region leads to early degradation of an exhaust purifying catalyst for cleaning an exhaust, the present circumstances are actually such that the lean operation region cannot be enlarged to a degree to which fuel consumption is improved adequately.

Thus, in actuality, with an engine for FFV, it is desired that improvement in exhaust gas performance by maintenance of exhaust purifying catalyst performance be achieved while achieving improvement in fuel consumption at the same time.

SUMMARY OF THE INVENTION

It is therefore an object of the invention to provide in an internal combustion engine operable by an alcohol-containing fuel, an internal combustion engine controller that can decrease a fuel consumption amount while improving exhaust gas performance.

In order to achieve the object, according to the invention, there is provided a controller of an internal combustion engine operable by an alcohol-containing fuel, the controller comprising:

an alcohol concentration detecting unit, operable to detect an alcohol concentration of the alcohol-containing fuel;

a feedback controller, operable to perform feedback control to make an exhaust air-fuel ratio of the internal combustion engine become equal to a target air-fuel ratio in accordance with an operation region; and an operation region setting unit, operable to set a stoichiometric operation region, in which the target air-fuel ratio is stoichiometric, in an enlarged manner when the alcohol concentration, detected by the alcohol concentration detecting unit, is higher than a concentration.

In the operation region in which the feedback controller operates, a timer region may be set where the feedback control is executed so that in a rich operation region, in which the target air-fuel ratio is a rich air-fuel ratio, the exhaust air-fuel ratio of the internal combustion engine becomes stoichiometric. The operation region setting unit may set a region including the timer region as an enlarged stoichiometric region.

The operation region setting unit may determine a boundary value of an enlarged stoichiometric region as a weighted average of a boundary value of the stoichiometric operation region during use of a fuel not containing alcohol and a boundary value of the stoichiometric operation region during use of a fuel containing a alcohol, using the alcohol concentration of the fuel containing the alcohol as a weight.

The feedback controller may control an ignition timing as an operating parameter and makes a spark advance correction amount of the ignition timing larger the higher the alcohol concentration detected by the alcohol concentration detecting unit.

DETAILED DESCRIPTION OF THE INVENTION

A configuration of an internal combustion engine controller shall now be described based on FIG. 1.

Figure 1:
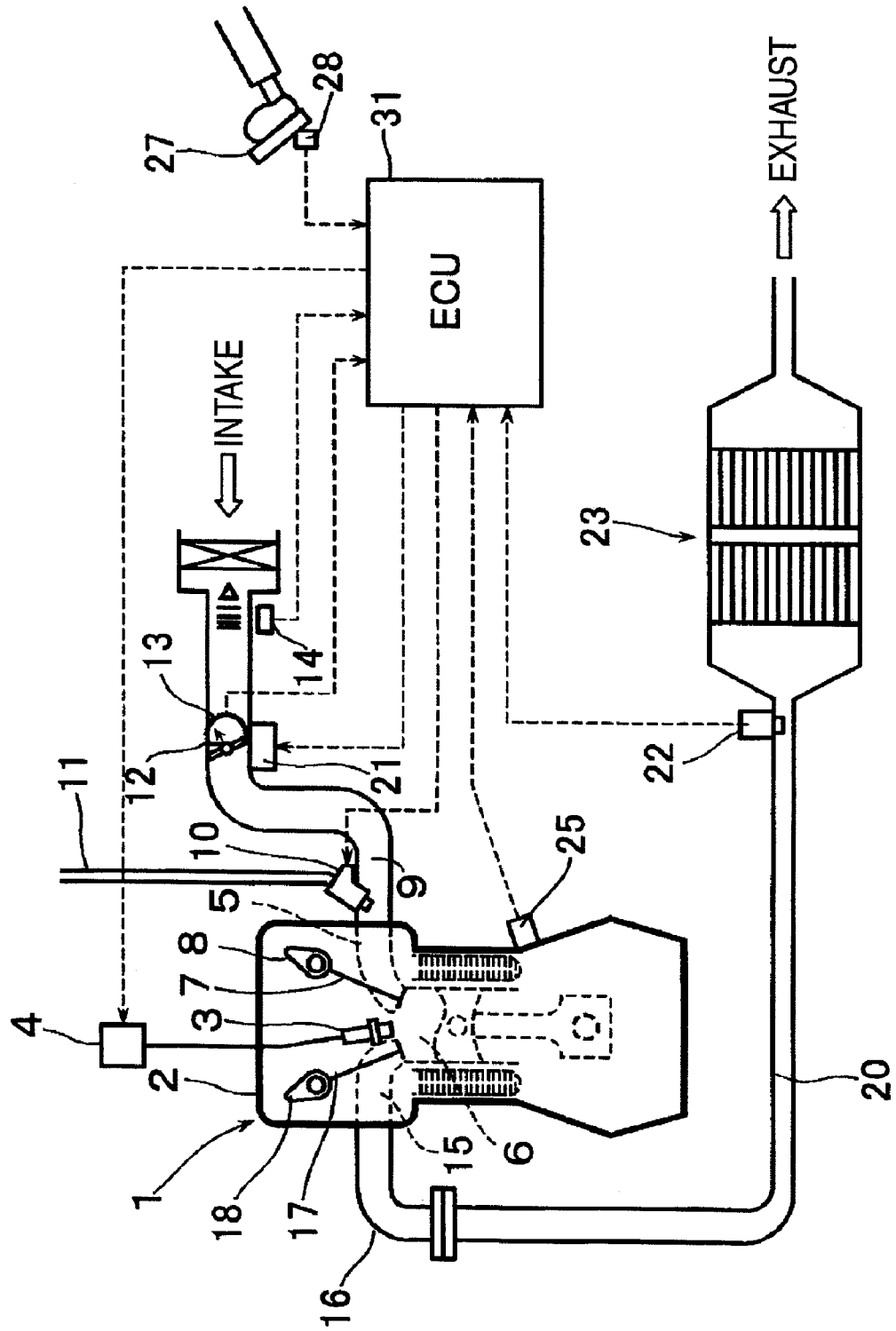
FIG. 1 is a schematic configuration diagram of an internal combustion engine including a controller according to an embodiment of the present invention.

As shown in FIG. 1, in a cylinder head 2 of an engine 1, which is an internal combustion engine mounted in an FFV, a spark plug 3 is mounted according to each cylinder, and an ignition coil 4, outputting a high voltage, is connected to each spark plug 3. In the cylinder head 2, an intake port 5 is formed according to each cylinder, and an intake valve 7 is disposed at a combustion chamber 6 side of each intake port 5. The intake valve 7 is actuated to open and close in accordance with a cam of a cam shaft 8, rotating according to an engine rotation, and thereby communicates and interrupts the intake port 5 and the combustion chamber 6.

One end of an intake manifold 9 is connected to and put in communication with each intake port 5. A solenoid fuel injection valve 10 is mounted on the intake manifold 9 in correspondence to each cylinder, and the fuel injection valve 10 is connected to a fuel pipe 11. The fuel pipe 11 is connected to an unillustrated fuel supplying device that supplies a blended fuel, containing alcohol (ethanol) and gasoline, from an unillustrated fuel tank.

On an intake tube at an upstream side of the intake manifold 9 are disposed a throttle valve 12, which is driven by an electrical actuator 21 to open and close an intake passage (air intake system passage), and a throttle position sensor 13, detecting a valve opening (throttle opening) of the throttle valve 12. An accelerator position sensor 28, detecting a stepped condition (accelerator opening) of an accelerator pedal 27, is provided, and the throttle valve 12 is driven to open and close according to detection information of the accelerator position sensor 28.

At an upstream side of the throttle valve 12 is disposed an air flow sensor 14, measuring an intake air amount. As the air flow sensor 14, for example, a Karman vortex type or hot film type air flow sensor is used. A load of the engine 1 is detected based on the intake air amount measured by the air flow sensor 14. The load of the engine 1 can also be detected by judging a charging efficiency from negative pressure circumstances of the intake manifold.

Meanwhile, in the cylinder head 2, an exhaust port 15 is formed according to each cylinder, and an exhaust valve 17 is disposed at the combustion chamber 6 side of each exhaust port 15. The exhaust valve 17 is actuated to open and close according to a cam of a cam shaft 18, rotating in accordance with the engine rotation, and thereby communicates and interrupts the exhaust port 15 and the combustion chamber 6. One end of an exhaust manifold 16 is connected to each exhaust port 15, and each exhaust port 15 is thereby put in communication with the exhaust manifold 16. Because such an intake tube injection type multi-cylinder gasoline engine is known, details of the configuration are omitted.

An exhaust pipe (exhaust passage) 20 is connected to the other end of the exhaust manifold 16, and an exhaust purifying catalyst 23 is disposed in the exhaust pipe 20. On the exhaust pipe 20 at an upstream side of the exhaust purifying catalyst 23, an air-fuel ratio sensor 22 is disposed as an air-fuel ratio detecting unit, and an exhaust air-fuel ratio is detected by the air-fuel ratio sensor 22. The exhaust air-fuel ratio is detected by the air-fuel ratio sensor 22, and a fuel injection amount is feedback controlled with respect to the detected exhaust air-fuel ratio. An alcohol concentration of a blended fuel is estimated according to a proportion of correction of fuel injection amount in this process.

Because the alcohol concentration is not constantly fixed and because fuel characteristics change according to the alcohol concentration (blend ratio), when a blended fuel is to be used, the alcohol concentration must be ascertained. Because alcohol (ethanol) has an energy density of approximately ⅔ that of gasoline, to obtain an air-fuel ratio equivalent to that for gasoline, the fuel injection amount must be increased by approximately 1.3 times to 1.5 times. To obtain a desired air-fuel ratio, the fuel injection amount during alcohol use is set in advance. Because the alcohol concentration can thus be estimated from the fuel injection amount when the exhaust air-fuel ratio is feedback controlled to a stoichiometric air-fuel ratio, the alcohol concentration can be ascertained based on the exhaust air-fuel ratio (alcohol concentration detecting unit).

As the air-fuel ratio sensor 22, an $O_2$ sensor or a linear air-fuel ratio sensor (LAFS) can be used.

An ECU (electronic control unit) 31 includes an input/output device, a memory device (ROM, RAM, etc.), a central processing unit (CPU), a timer counter, etc. By the ECU 31, comprehensive control of the controller, including the engine 1, is performed.

In addition to the throttle position sensor 13, the air flow sensor 14, and the air-fuel ratio sensor 22, various sensors, including a crank angle sensor 25, which detects a crank angle of the engine 1, etc., are connected to and detection information from these sensors are input into an input side of the ECU 31. Based on the information from the crank angle sensor 25, the ignition timing is set and an engine rotation speed is determined.

Meanwhile, the fuel injection valve 10, the ignition coil 4, the throttle valve 12, and various other output devices are connected to an output side of the ECU 31. A fuel injection amount, an ignition timing, a target throttle opening, etc., are computed by the ECU 31 based on the detection information from the various sensors and respectively output to the various output devices. That is, based on the detection information from the various sensors, an appropriate target air-fuel ratio (target A/F) is set in accordance with the alcohol concentration of the blended fuel, and based on the information from the air-fuel ratio sensor 22, feedback control is performed (feedback controller).

That is, the blended fuel of an amount in accordance with the target A/F is injected at an appropriate timing from the fuel injection valve 10, and the throttle valve 12 is adjusted to an appropriate opening and spark ignition is performed at an appropriate timing by the spark plug 3. The alcohol concentration of the blended fuel is estimated and ascertained based on the proportion of correction of the fuel injection amount at the time of feedback of the exhaust air-fuel ratio obtained from the information from the air-fuel ratio sensor 22.

With the engine 1, according to the present embodiment, when the alcohol concentration is higher than a predetermined concentration, a load region and a throttle opening region, at which stoichiometric feedback is performed, are enlarged according to the alcohol concentration (operation region setting unit). That is, when the alcohol concentration is higher than the predetermined concentration, a stoichiometric operation region, at which the target air-fuel ratio is set to a stoichiometric ratio, is set in an enlarged manner. Because an exhaust temperature is low when the alcohol concentration is high, even when the stoichiometric operation region is enlarged (an enlarged stoichiometric region is set), the exhaust purifying catalyst 23 does not become overheated. The fuel amount for fuel cooling etc., can thus be suppressed to improve an exhaust purifying performance at a minimum fuel amount.

Also, when control is performed at a rich air-fuel ratio, transition to a stoichiometric operation region that is in accordance with the alcohol concentration is performed to enlarge the stoichiometric operation region and lower the fuel consumption amount. Furthermore, because alcohol is high in octane number, is less likely to cause knocking, and is advantageous in terms of thermal efficiency, a basic ignition timing is corrected by addition of an ignition timing correction amount that is in accordance with the alcohol concentration, and an ignition timing when gasoline is used as the fuel is thus subject to spark advance correction when the alcohol concentration is high to improve fuel consumption.

Setting of the target A/F according to the alcohol (ethanol) concentration shall now be described based on FIGS. 2 to 5.

Figure 2:
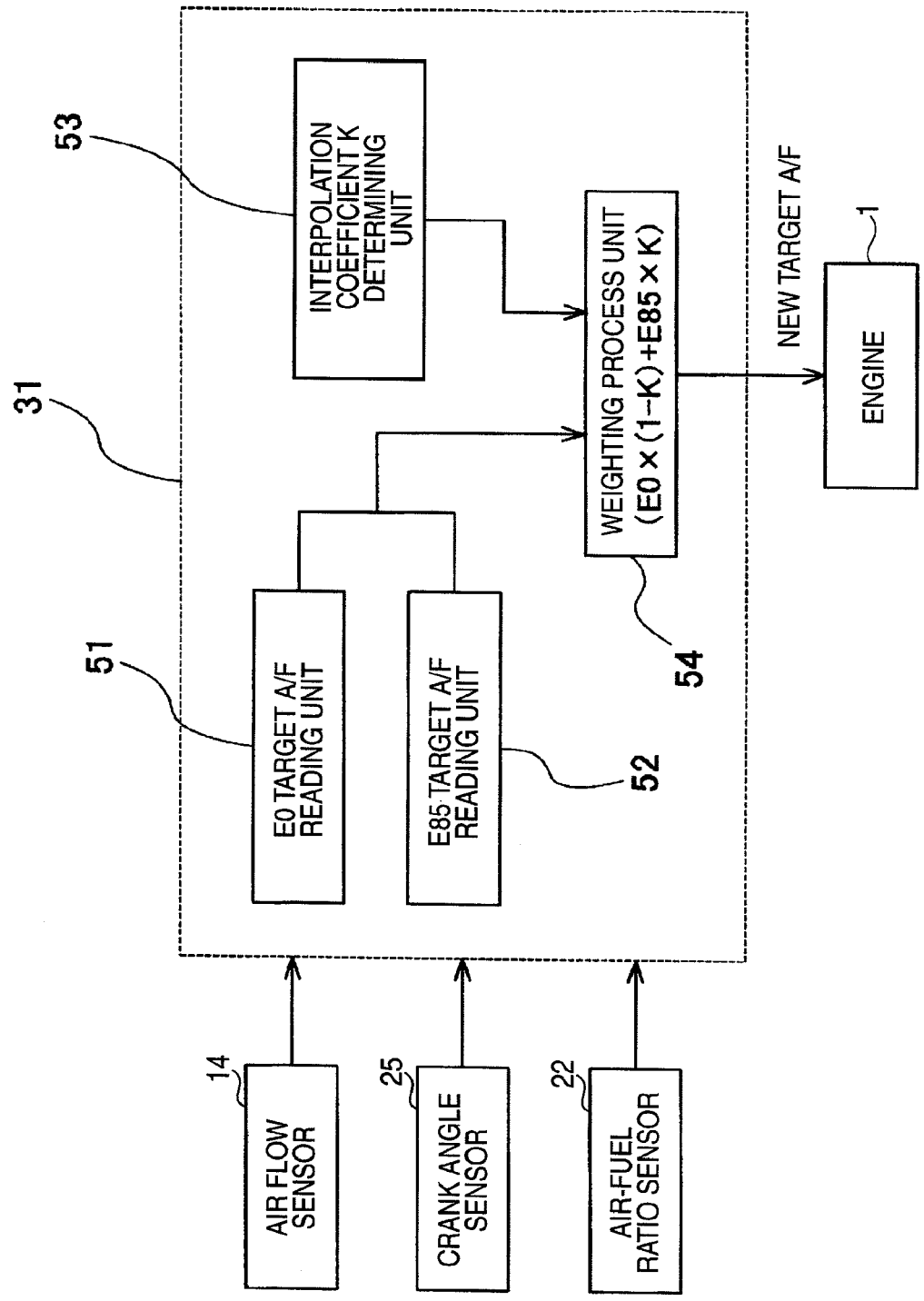
FIG. 2 is a control block diagram for setting a target air-fuel ratio.

As shown in FIG. 2, the ECU 31 has an E0 target A/F reading unit 51, reading a target A/F in a case of using a 100% gasoline fuel (a 0% ethanol fuel; E0), and an E85 target A/F reading unit 52, reading a target A/F in a case of using an 85% ethanol fuel (a 15% gasoline fuel; E85).

Figure 3:
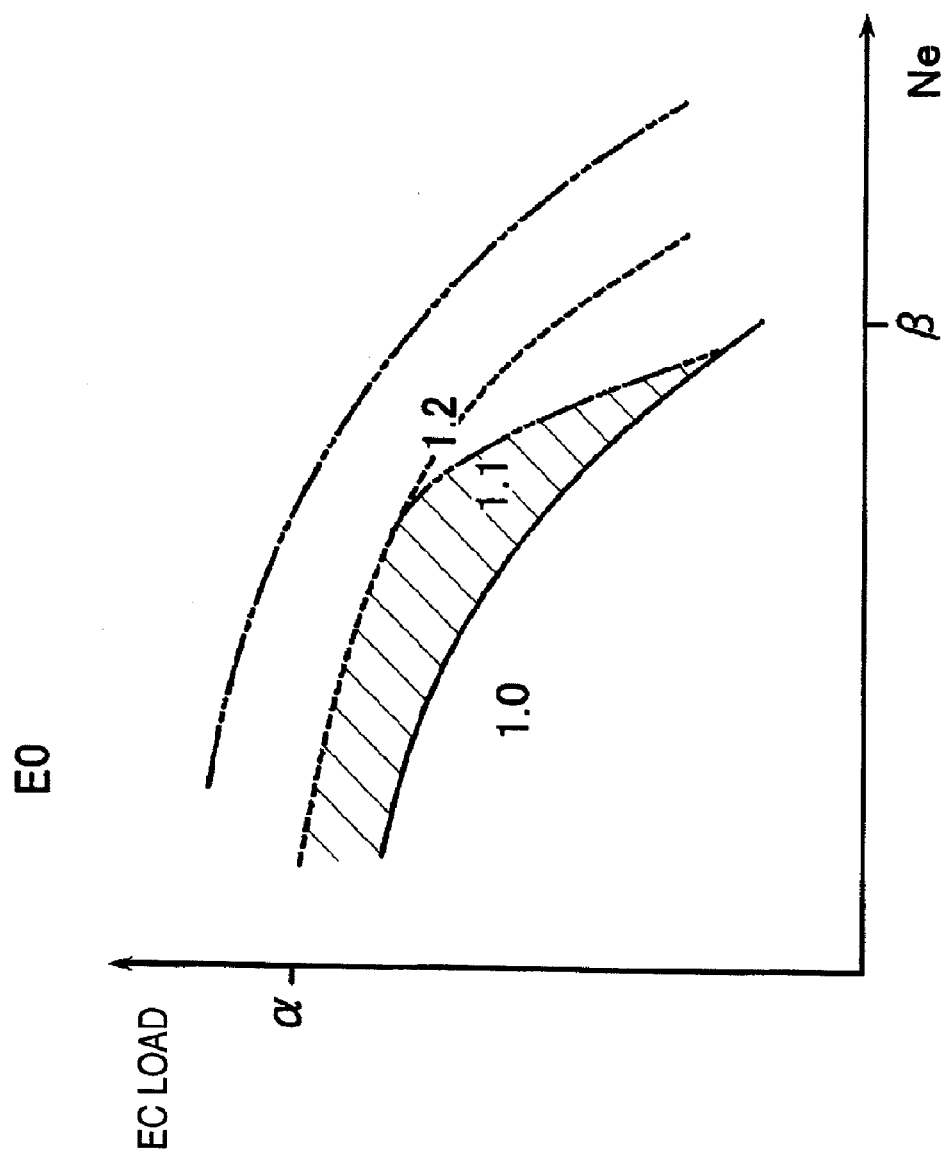
FIG. 3 is a graph expressing an air-fuel ratio (equivalence ratio) based on a load and an engine rotation speed in a case of use of 100% gasoline (0% ethanol).

At the E0 target A/F reading unit 51, the target A/F that is in accordance with a load Ec and an engine rotation speed Ne is read from a map, shown in FIG. 3, that expresses target A/F regions for E0. For the target A/F, a stoichiometric air-fuel ratio region, in which an equivalence ratio is 1.0, and a rich air/fuel ratio region, in which the equivalent ratio is greater than 1.0, are set. A timer region (region indicated by slanted lines in the figure), in which operation by A/F feedback is continued for a predetermined period during which the exhaust purifying catalyst 23 does not become overheated, is present in a portion of the rich air/fuel ratio region of equivalent ratio greater than 1.0.

Figure 4:
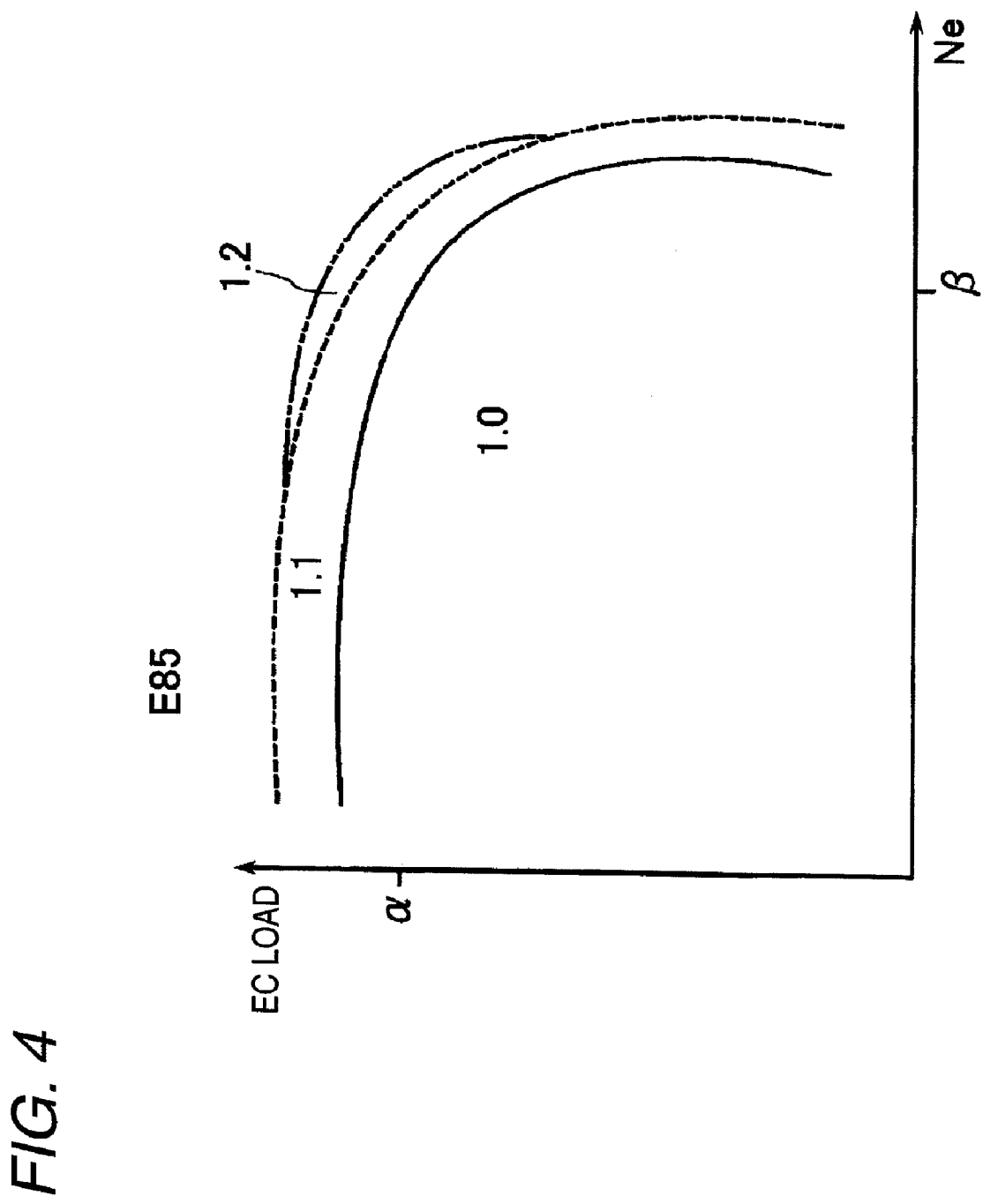
FIG. 4 is a graph expressing the air-fuel ratio (equivalence ratio) based on the load and the engine rotation speed in a case of use of 85% ethanol.

At the E85 target A/F reading unit 52, the target A/F that is in accordance with the load Ec and the engine rotation speed Ne for E85 is read from a map, shown in FIG. 4, that expresses target A/F regions. For the target A/F, a stoichiometric region, in which the equivalence ratio is 1.0 (stoichiometric operation region), and a rich air/fuel ratio region, in which the equivalent ratio is greater than 1.0 (rich operation region), are set. A region in which the timer region is present in the map shown in FIG. 3, that is, the region in which the load Ec is no more than α and the engine rotation speed Ne is no more than β, is set as the stoichiometric region in which the equivalence ratio is 1.0 in the map shown in FIG. 4. That is, the timer region (in the rich operation region) for E0 is included in the target A/F region (enlarged stoichiometric region) for E85.

Figure 5:
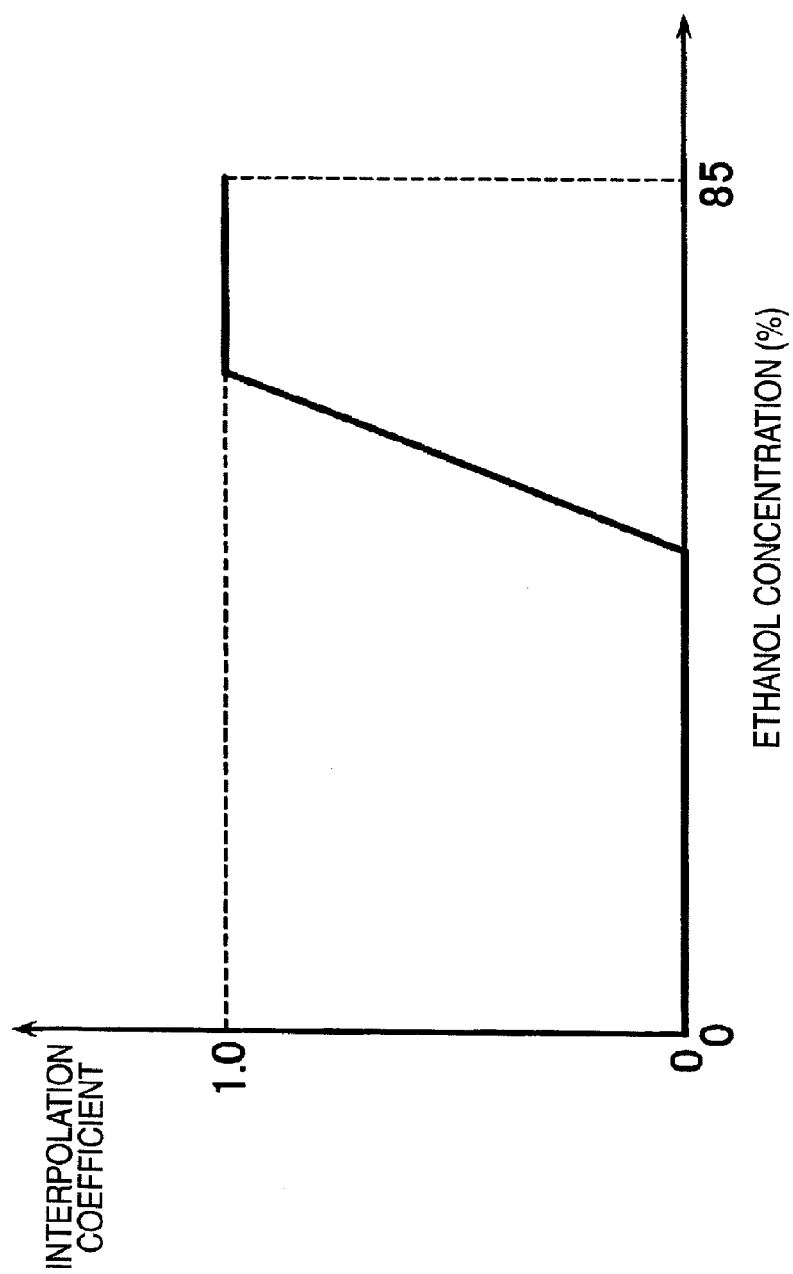
FIG. 5 is a graph expressing a relationship between an interpolation coefficient and an ethanol concentration.

Meanwhile, an interpolation coefficient K, for weighted averaging by respective proportions (weights) of the target A/F for E0 and the target A/F for E85 according to the ethanol concentration, is determined by an interpolation coefficient K determining unit 53. That is, as shown in FIG. 5, the interpolation coefficient K is set according to the ethanol concentration, with the interpolation coefficient K being 0 up to a detected ethanol concentration of approximately 60% to 70% (predetermined concentration), the interpolation coefficient K thereafter approaching 1 as the ethanol concentration rises, and the interpolation coefficient K becoming 1 when the ethanol concentration becomes slightly less than 85%.

The target A/F read by the E0 target A/F reading unit 51, the target A/F read by the E85 target A/F reading unit 52, and the interpolation coefficient K, determined by the interpolation coefficient K determining unit 53 in accordance with the ethanol concentration, are input into a weighting process unit 54. At the weighting process unit 54, weighted averaging by the respective proportions (weights) of the target A/F read by the E0 target A/F reading unit 51 and the target A/F read by the E85 target A/F reading unit 52 is performed according to the interpolation coefficient K to determine a target A/F in accordance with the ethanol concentration.

That is, at the weighting process unit 54, a value determined by multiplying the target A/F read by the E0 target A/F reading unit 51 by (1−K) and a value determined by multiplying the target A/F read by the E85 target A/F reading unit 52 by K are added together to determine a new target A/F, which is then output to the engine 1.

That is, the new target A/F is determined as:

$$\text{new target } A/F = (E0 \text{ target } A/F) \times (1-K) + (E85 \text{ target } A/F) \times K$$

and output to the engine 1.

For example, up to an ethanol concentration of approximately 60% to 70% (the predetermined concentration), because the interpolation coefficient K is set to 0, the target A/F read by the E0 target A/F reading unit 51 is determined as it is as the new target A/F, and when the ethanol concentration is in a range of slightly less than 85% to 85% (the concentration is higher than the predetermined concentration), because the interpolation coefficient K is set to 1, the target A/F read by the E85 target A/F reading unit 52 is determined as it is as the new target A/F. When the ethanol concentration is in a range between the concentration of approximately 60% to 70% (the predetermined concentration) and the concentration slightly less than 85% (the concentration higher than the predetermined concentration), a target A/F, such that the proportion (weight) of the target A/F read by the E85 target A/F reading unit 52 increases gradually, is determined as the new target A/F.

By thus weightedly averaging, according to the alcohol concentration, the boundary value of the stoichiometric operation region of the load Ec and the engine rotation speed Ne set for 100% gasoline (0% ethanol) and the boundary value of the stoichiometric operation region of the load Ec and the engine rotation speed Ne set for 85% ethanol (15% gasoline), a boundary value of the enlarged stoichiometric region of the load Ec and the engine rotation speed Ne that is in accordance with the alcohol concentration is determined and the operation region is thereby enlarged.

With the new target A/F thus determined according to the ethanol concentration, the target A/F (equivalent ratio), set for 100% gasoline (0% ethanol), and the target A/F (equivalent ratio), set for 85% ethanol (15% gasoline), are weightedly averaged to determine the target A/F based on the ethanol concentration. By thus transiting from the rich air-fuel ratio to the air-fuel ratio in accordance with the ethanol concentration when the ethanol concentration is high, the fuel consumption amount can be decreased.

Setting of the feedback operation region in accordance with the alcohol (ethanol) concentration shall now be described based on FIGS. 6 to 8.

Setting of a feedback zone (FB zone) load (Ec) region shall now be described based on FIGS. 6 and 7.

Figure 6:
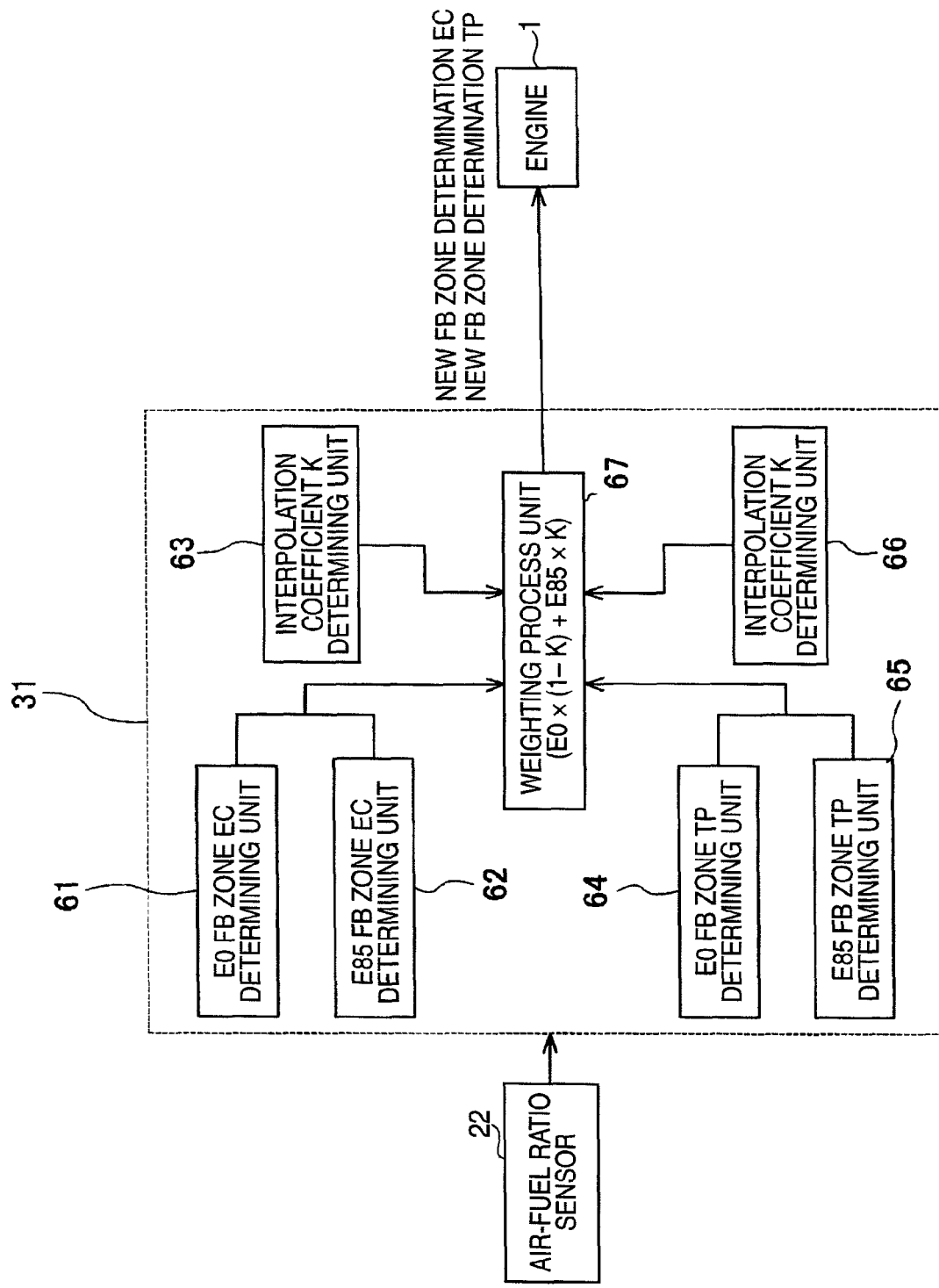
FIG. 6 is a control block diagram for setting a feedback operation region.

As shown in FIG. 6, the ECU 31 has an E0 FB zone Ec determining unit 61, determining a load (Ec) of a feedback zone (FB zone) in which feedback control is performed stoichiometrically when the 100% gasoline fuel (0% ethanol fuel; E0) is used, and an E85 FB zone Ec determining unit 62, determining a load (Ec) of a feedback zone (FB zone) in which feedback control is performed stoichiometrically when the 85% ethanol fuel (15% gasoline fuel; E85) is used.

Figure 7:
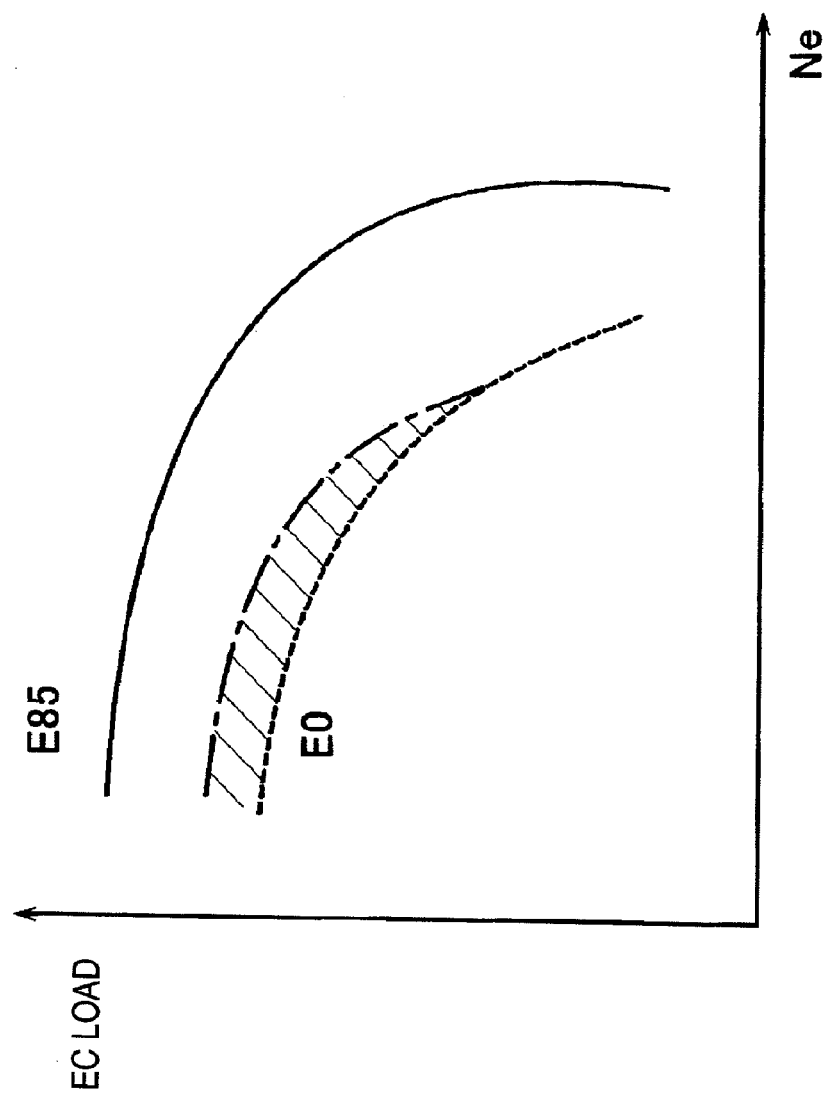
FIG. 7 is a graph of an operation region based on the engine rotation speed and the load.

At the E0 FB zone Ec determining unit 61, based on the map shown in FIG. 7 that expresses the FB zone of the load Ec, an upper limit (determination region) of the FB zone load Ec (indicated by a dotted line in the figure) that is in accordance with the engine rotation speed Ne in the case of the E0 fuel, that is, a boundary value of the stoichiometric operation region when a fuel not containing alcohol is used is determined. At an outer side (rich region side) of the FB zone of the load Ec in the case of the E0 fuel, a timer region (region indicated by slanted lines in the figure) is present in which A/F feedback is continued for a predetermined period during which the exhaust purifying catalyst 23 does not become overheated even when the load Ec becomes high.

At the E85 FB zone Ec determining unit 62, based on the map shown in FIG. 7 that expresses the FB zone of the load Ec, an upper limit (determination region) of the FB zone load Ec (indicated by a solid line in the figure) that is in accordance with the engine rotation speed Ne in the case of the E85 fuel, that is, a boundary value of the stoichiometric operation region when a fuel containing a predetermined alcohol is used is determined. The FB zone load Ec region for the E85 fuel is enlarged to a higher region (wider region) than the FB zone load Ec for the E0 fuel. The timer region in the case of the E0 fuel is included in the FB zone for the E85 fuel.

Because the exhaust temperature is low when the ethanol concentration is high, even when the region of the load Ec of the FB zone is enlarged and the fuel amount for fuel cooling, etc., is suppressed, overheating of the exhaust purifying catalyst 23 does not occur, and the purifying performance of the exhaust purifying catalyst 23 can be improved at the minimum fuel amount at which a travelling performance can be maintained. Also, a simple control, with which the timer region is eliminated, can be realized.

Meanwhile, an interpolation coefficient K, for weighted averaging by respective proportions (weights) of the FB zone load Ec determination region for E0 and the FB zone load Ec determination region for E85, is determined by an interpolation coefficient K determining unit 63. At the interpolation coefficient K determining unit 63, the same interpolation coefficient K as the above-described interpolation coefficient K for apportioning the proportions of the target A/F (see FIG. 5) is used. That is, as shown in FIG. 5, the interpolation coefficient K is set to 0 up to a detected ethanol concentration of approximately 60% to 70% (predetermined concentration), the interpolation coefficient K thereafter approaches 1 as the ethanol concentration rises, and the interpolation coefficient K becomes 1 at an ethanol concentration slightly less than 85%.

The upper limit (determination region) of the load Ec determined by the E0 FB zone Ec determining unit 61, the upper limit (determination region) of the load Ec determined by the E85 FB zone Ec determining unit 62, and the interpolation coefficient K, determined by the interpolation coefficient K determining unit 63 in accordance with the ethanol concentration, are input into a weighting process unit 67. At the weighting process unit 67, weighted averaging by the respective proportions (weights) of the upper limit (determination region) of the load Ec determined by the E0 FB zone Ec determining unit 61 and the upper limit (determination region) of the load Ec determined by the E85 FB zone Ec determining unit 62 is performed according to the interpolation coefficient K, determined in accordance with the ethanol concentration at the interpolation coefficient K determining unit 63, to determine an upper limit (determination region) of the load Ec in accordance with the ethanol concentration, that is, a boundary value of the enlarged stoichiometric region.

That is, at the weighting process unit 67, a value determined by multiplying the upper limit (determination region) of the load Ec determined by the E0 FB zone Ec determining unit 61 by (1−K) and a value determined by multiplying the upper limit (determination region) of the load Ec determined by the E85 FB zone Ec determining unit 62 by K are added together to determine a new upper limit (determination region) of the FB zone load Ec, which is then output to the engine 1.

That is, the new FB zone determination Ec is determined as:

new $FB$ zone determination $Ec=(E0\ FB$ zone determination $Ec)\times(1-K)+(E85\ FB$ zone determination $Ec)\times K$ and output to the engine 1.

For example, up to an ethanol concentration of approximately 60% to 70% (the predetermined concentration), because the interpolation coefficient K is set to 0, the load Ec upper limit (determination region) determined by the E0 FB zone Ec determining unit 61 is determined as it is as the new FB zone determination Ec, and when the ethanol concentration is in a range of slightly less than 85% to 85% (the concentration is higher than the predetermined concentration), because the interpolation coefficient K is set to 1, the load Ec upper limit (determination region) determined by the E85 FB zone Ec determining unit 62 is determined as it is as the new FB zone determination Ec. When the ethanol concentration is in a range between the concentration of approximately 60% to 70% (the predetermined concentration) and the concentration slightly less than 85% (the concentration higher than the predetermined concentration), an FB zone determination Ec, with which the proportion (weight) of the load Ec upper limit (determination region) determined by the E85 FB zone Ec determining unit 62 increases gradually, is determined as the new FB zone determination Ec.

By the new FB zone determination Ec thus being determined according to the ethanol concentration, the FB zone load Ec region, in which stoichiometric control is performed, is enlarged based on the ethanol concentration (enlarged stoichiometric region) and the operation region, in which the purifying performance of the exhaust purifying catalyst 23 is high, can be enlarged. That is, in the enlarged stoichiometric region, the fuel amount for fuel cooling etc., can be suppressed to improve the purifying performance of the exhaust purifying catalyst 23 at the minimum fuel amount at which the travelling performance can be maintained.

Setting of a feedback zone (FB zone) throttle opening (TP) region shall now be described based on FIGS. 6 and 8.

As shown in FIG. 6, the ECU 31 has an E0 FB zone TP determining unit 64, determining a throttle opening (TP) of a feedback zone (FB zone) in which feedback control is performed stoichiometrically when the 100% gasoline fuel (0% ethanol fuel; E0) is used, and an E85 FB zone TP determining unit 65, determining a throttle opening (TP) of a feedback zone (FB zone) in which feedback control is performed at the stoichiometric air-fuel ratio when the 85% ethanol fuel (15% gasoline fuel; E85) is used.

Figure 8:
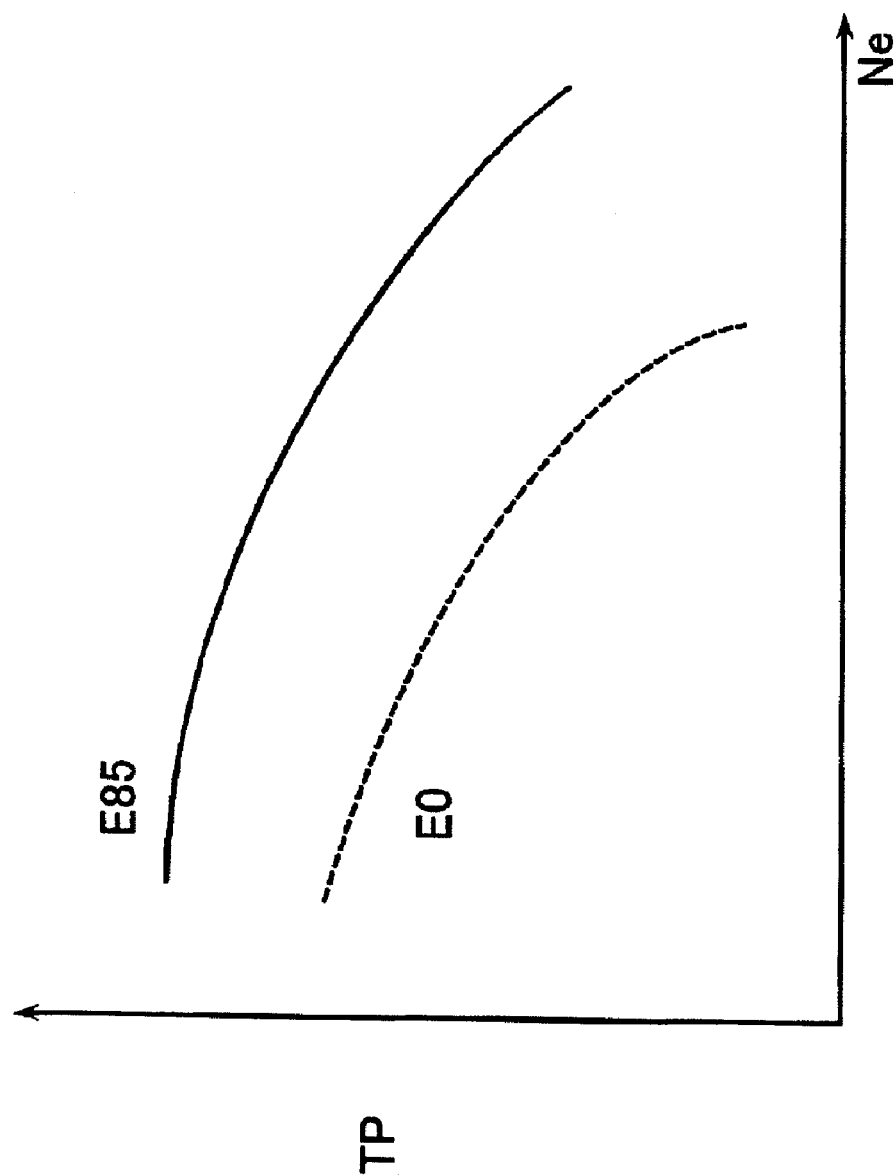
FIG. 8 is a graph of an operation region based on the engine rotation speed and the throttle opening.

At the E0 FB zone TP determining unit 64, based on the map shown in FIG. 8 that expresses the FB zone of the throttle opening TP, an upper limit (determination region) of the FB zone throttle opening TP (indicated by a dotted line in the figure) that is in accordance with the engine rotation speed Ne in the case of the E0 fuel, that is, a boundary value of the stoichiometric operation region when a fuel not containing alcohol is used is determined. At the E85 FB zone TP determining unit 65, based on the map shown in FIG. 8 that expresses the FB zone of the throttle opening TP, an upper limit (determination region) of the FB zone throttle opening TP (indicated by a solid line in the figure) that is in accordance with the engine rotation speed Ne in the case of the E85 fuel, that is, a boundary value of the stoichiometric operation region when a fuel containing a predetermined alcohol is used is determined.

Because the exhaust temperature is low when the ethanol concentration is high, even when the fuel amount for fuel cooling, etc., is suppressed, overheating of the exhaust purifying catalyst 23 does not occur, and the purifying performance of the exhaust purifying catalyst 23 can be improved at the minimum fuel amount at which the travelling performance can be maintained by enlarging the FB zone throttle opening TP region.

Meanwhile, an interpolation coefficient K, for apportioning proportions of the determination region of the FB zone throttle opening TP for E0 and the determination region of the FB zone throttle opening TP for E85, is determined in an interpolation coefficient K determining unit 66. At the interpolation coefficient K determining unit 66, the same interpolation coefficient K as the above-described interpolation coefficient K for weighted averaging by the proportions (weights)

of the target A/F (see FIG. 5) is used. That is, as shown in FIG. 5, the interpolation coefficient K is set to 0 up to a detected ethanol concentration of approximately 60% to 70% (predetermined concentration), the interpolation coefficient K thereafter approaches 1 as the ethanol concentration rises, and the interpolation coefficient K becomes 1 at an ethanol concentration slightly less than 85%.

The upper limit (determination region) of the throttle opening TP determined by the E0 FB zone TP determining unit 64, the upper limit (determination region) of the throttle opening TP determined by the E85 FB zone TP determining unit 65, and the interpolation coefficient K, determined by the interpolation coefficient K determining unit 66 in accordance with the ethanol concentration, are input into the weighting process unit 67. At the weighting process unit 67, weighted averaging by respective proportions (weights) of the upper limit (determination region) of the throttle opening TP determined by the E0 FB zone TP determining unit 64 and the upper limit (determination region) of the throttle opening TP determined by the E85 FB zone TP determining unit 65 is performed according to the interpolation coefficient K, determined in accordance with the ethanol concentration at the interpolation coefficient K determining unit 66, to determine an upper limit (determination region) of the throttle opening TP in accordance with the ethanol concentration, that is, a boundary value of the enlarged stoichiometric region.

That is, at the weighting process unit 67, a value determined by multiplying the upper limit (determination region) of the throttle opening TP determined by the E0 FB zone TP determining unit 64 by (1−K) and a value determined by multiplying the upper limit (determination region) of the throttle opening TP determined by the E85 FB zone TP determining unit 65 by K are added together to determine a new upper limit (determination region) of the throttle opening TP of the FB zone, which is then output to the engine 1.

That is, the new FB zone determination TP is determined as:

new *FB* zone determination *TP*=(*E0 FB* zone determination *TP*)×(1−*K*)+(*E85 FB* zone determination *TP*)×*K* and output to the engine 1.

For example, up to an ethanol concentration of approximately 60% to 70% (the predetermined concentration), because the interpolation coefficient K is set to 0, the throttle opening TP upper limit (determination region) determined by the E0 FB zone TP determining unit 64 is determined as it is as the new FB zone determination TP, and when the ethanol concentration is in a range of slightly less than 85% to 85% (the concentration is higher than the predetermined concentration), because the interpolation coefficient K is set to 1, the throttle opening TP upper limit (determination region) determined by the E85 FB zone TP determining unit 65 is determined as it is as the new FB zone determination TP. When the ethanol concentration is in a range between the concentration of approximately 60% to 70% (the predetermined concentration) and the concentration slightly less than 85% (the concentration higher than the predetermined concentration), an FB zone determination TP, with which the proportion (weight) of the throttle opening TP upper limit (determination region) determined by the E85 FB zone TP determining unit 65 increases gradually, is determined as the new FB zone determination TP.

By thus weightedly averaging, according to the alcohol concentration, the boundary value of the stoichiometric operation region of the throttle opening TP and the engine rotation speed Ne set for 100% gasoline (0% ethanol) and the boundary value of the stoichiometric operation region of the throttle opening TP and the engine rotation speed Ne set for 85% ethanol (15% gasoline), a boundary value of the enlarged stoichiometric region for the throttle opening TP and the engine rotation speed Ne that is in accordance with the alcohol concentration is determined and the operation region is thereby enlarged.

By the new FB zone determination TP thus being determined according to the ethanol concentration, the FB zone throttle opening TP region, in which stoichiometric control is performed, is enlarged based on the ethanol concentration (enlarged stoichiometric region) and the stoichiometric control region is thus enlarged when the ethanol concentration becomes higher than the predetermined concentration and the purifying performance of the exhaust purifying catalyst 23 can be improved. That is, in the enlarged stoichiometric region, the fuel amount for fuel cooling etc., can be suppressed to improve the purifying performance of the exhaust purifying catalyst 23 at the minimum fuel amount at which the travelling performance can be maintained.

With the ignition timing of an internal combustion engine using gasoline as the fuel, differences between regular and high octane gasoline are corrected, learned, and set by knock control. A plurality of ignition timings, interpolated by knock learning, are set according to valve timings. Because ethanol is high in octane number, is unlikely to cause knocking, and thus advantageous in terms of thermal efficiency, with the present embodiment (feedback controller), the knock learning interpolated ignition timing when gasoline is used as the fuel is subject to spark advance correction when the alcohol concentration is high to improve the fuel consumption.

Setting of the ignition timing according to the alcohol (ethanol) concentration shall now be described based on FIGS. 9 and 10.

Figure 9:
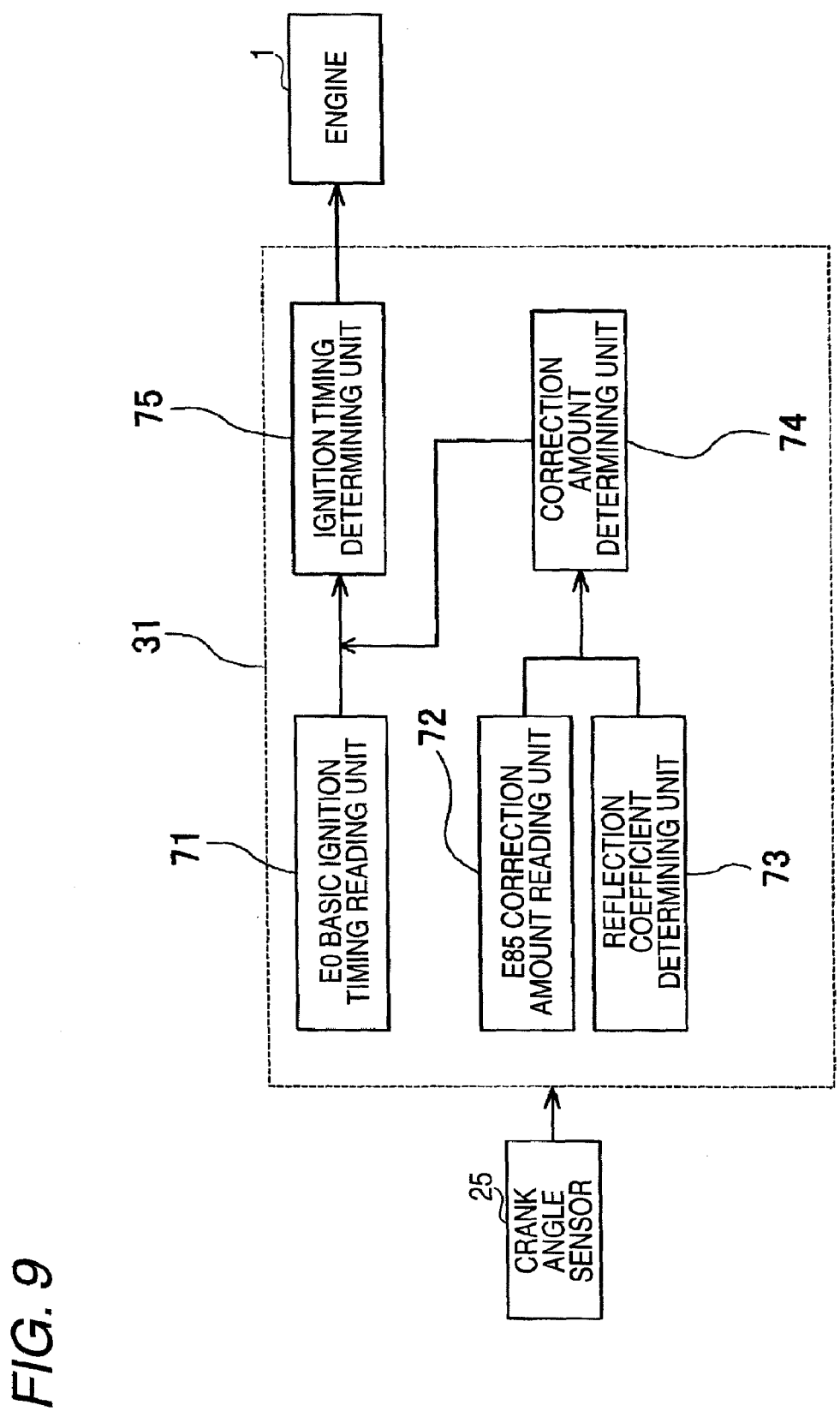
FIG. 9 is a control block diagram for setting an ignition timing.
Figure 10:
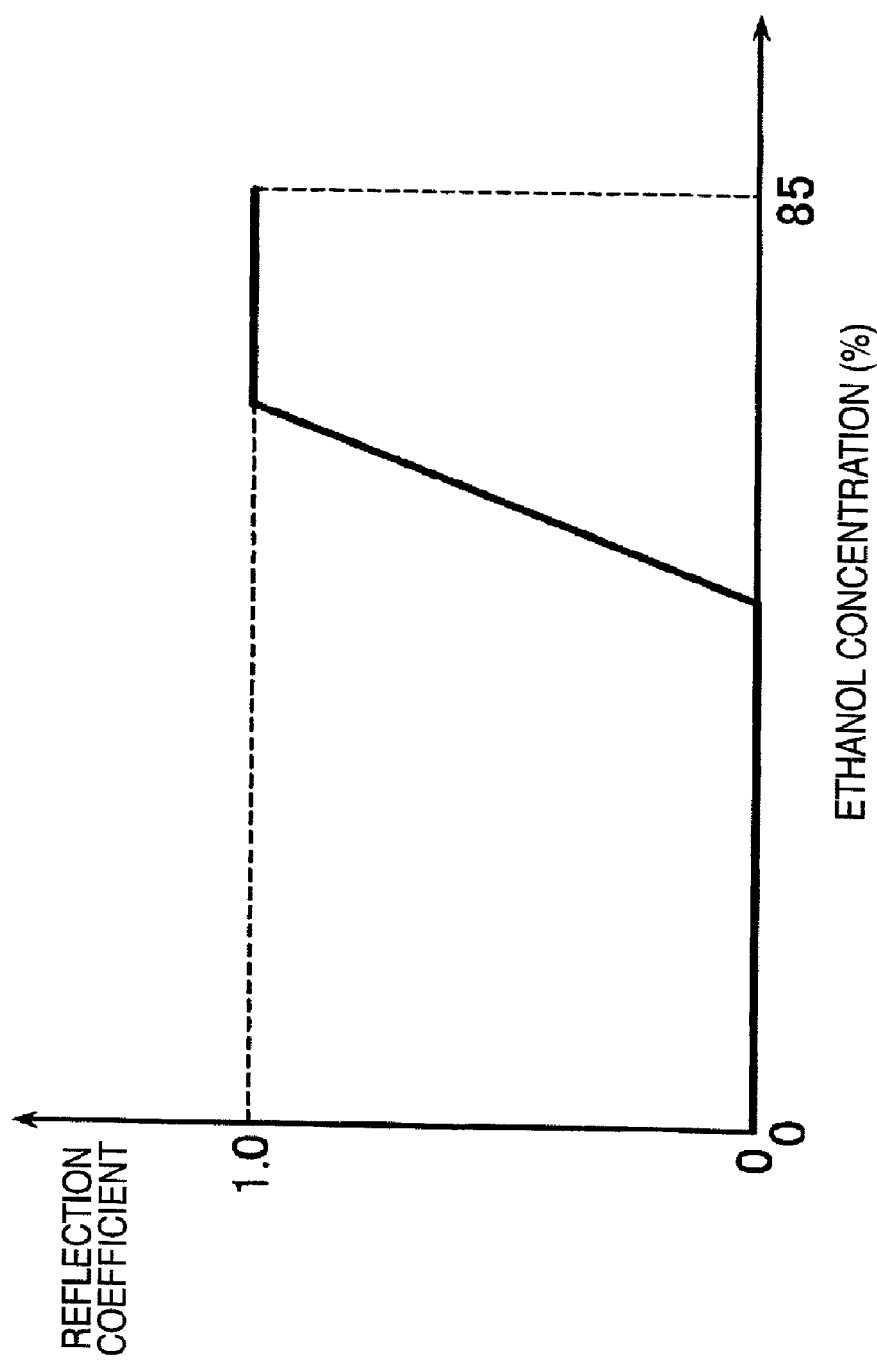
FIG. 10 is a graph of a relationship of a reflection coefficient and the ethanol concentration.

As shown in FIG. 9, the ECU 31 has an E0 basic ignition timing reading unit 71, reading the knock learning interpolated ignition timing (basic ignition timing) for the case where the 100% gasoline fuel (0% ethanol fuel; E0) is used. The ECU 31 also has an E85 correction amount reading unit 72, reading a correction amount (spark advance/spark retardation) for the case where the 85% ethanol fuel (15% gasoline fuel; E85) is used. The basic ignition timing, read by the E0 basic ignition timing reading unit 71, and the correction amount, read by the E85 correction amount reading unit 72, are memorized in an unillustrated map.

Meanwhile, a reflection coefficient, for determining a proportion (reflection proportion) by which the correction amount for E85 (spark advance/spark retardation) is reflected in the correction of the basic ignition timing according to the ethanol concentration, is determined by a reflection coefficient determining unit 73. As shown in FIG. 10, the reflection coefficient is set according to the ethanol coefficient, and the reflection coefficient is set to 0 up to a detected ethanol concentration of approximately 60% to 70% (predetermined concentration), the reflection coefficient thereafter approaches 1 as the ethanol concentration rises, and the reflection coefficient becomes 1 at an ethanol concentration slightly less than 85%.

The basic ignition timing correction amount (spark advance/spark retardation), read by the E85 correction amount reading unit 72, and the reflection coefficient, determined according to the ethanol concentration by reflection coefficient determining unit 73, are input into a correction amount determining unit 74. At the correction amount determining unit 74, a proportion of reflection of the correction amount, read by the E85 correction amount reading unit 72, is determined according to the ethanol concentration. That is, the correction amount for E85 is not reflected and the correction amount is set to 0 up to an ethanol concentration of approximately 60% to 70% (predetermined concentration), the correction amount thereafter approaches the correction amount for E85 as the ethanol concentration rises, and the correction amount is set to the correction amount for E85 when the ethanol concentration becomes slightly less than 85%.

The correction amount determined at the correction amount determining unit 74 is added to the basic ignition timing, read by the ED basic ignition timing reading unit 71, and the basic ignition timing is thereby corrected (determined) according to the ethanol concentration at an ignition timing determining unit 75 and output to the engine 1. Specifically, because ethanol is high in octane number, is unlikely to cause knocking, and thus advantageous in terms of thermal efficiency, the basic ignition timing when gasoline is used as the fuel is spark advance corrected to improve the fuel consumption when the ethanol concentration is high.

By thus adding the ignition timing correction amount that is in accordance with the ethanol concentration of the fuel to the basic ignition timing (the ignition timing for the fuel that does not contain ethanol), read by the E0 basic ignition timing reading unit 71 (by making the spark advance correction amount of the ignition timing larger the higher the ethanol concentration), the basic ignition timing can be corrected to improve fuel consumption when the ethanol concentration is high.

With the ignition timing of an internal combustion engine using gasoline as the fuel, differences between regular and high octane gasoline are corrected, learned, and set according to knock control and a plurality of basic ignition timings are set according to valve timings. A plurality of basic ignition timings of the internal combustion engine using gasoline as the fuel are thus memorized, and when ignition timings according to alcohol concentration are set further in correspondence to the plurality of basic ignition timings, loads placed on a memory unit and a processing unit become enormous.

By performing, as described above, addition of the correction amount according to ethanol concentration on the basis of the basic ignition timing for the case where gasoline is used as the fuel, the ignition timing in accordance with the ethanol concentration can be set without increasing loads placed on the memory unit and the processing unit.

With the engine 1 of the present embodiment, because the region of the load Ec and the region of the throttle opening TP in which feedback at the stoichiometric ratio is performed according to the ethanol concentration are enlarged when the ethanol concentration is higher than the predetermined concentration, the fuel amount for fuel cooling, etc., can be suppressed and the exhaust purifying performance can be improved at the minimum fuel amount in the case where the ethanol concentration is high and overheating of the exhaust purifying catalyst 23 does not occur even when the stoichiometric operation range is enlarged.

Also, when control at a rich air-fuel ratio is performed, by transiting to the stoichiometric ratio that is in accordance with the alcohol concentration, the stoichiometric ratio operation region is enlarged to lower the fuel consumption amount. Furthermore, by correcting the basic ignition timing by adding the ignition timing correction amount for the fuel according to the ethanol concentration and performing spark advance correction of the basic ignition timing, when gasoline is used as the fuel, in the case where the ethanol concentration is high, the fuel consumption can be improved.

According to an aspect of the invention, because an exhaust temperature is low when the alcohol concentration is high, even when the operation region, in which control is performed stoichiometrically, is enlarged as the enlarged stoichiometric region in accordance with the alcohol concentration when the alcohol concentration is higher than the predetermined concentration and a fuel amount for fuel cooling, etc., is suppressed, an exhaust purifying catalyst does not become overheated and a purifying performance of the exhaust purifying catalyst can be improved at a minimum fuel amount at which a travelling performance can be maintained. The fuel consumption amount can thus be decreased while improving the exhaust gas performance.

According to an aspect of the invention, because a region, including a timer region, in which operation is ordinarily performed with a rich air-fuel ratio but operation by A/F feedback is continued for a predetermined period during which overheating of the exhaust purifying catalyst does not occur, is set as the enlarged stoichiometric region, which is the operation region that is enlarged according to the alcohol concentration, a simple control, with which the timer region is eliminated, can be realized.

According to an aspect of the invention, for example, a boundary value of a stoichiometric operation region set for 100% gasoline (0% ethanol) and a boundary value of a stoichiometric operation region set for 85% ethanol can be averaged weightedly based on the alcohol concentration to determine the boundary value of the stoichiometric region that is enlarged according to the alcohol concentration and thereby enlarge the operation range.

According to an aspect of the invention, the ignition timing can be corrected by adding the spark advance correction amount of the ignition timing for a fuel in accordance with the alcohol concentration detected by the alcohol concentration detecting unit. Specifically, because alcohol is high in octane number, does not cause knocking readily, and is thus advantageous in terms of thermal efficiency, when the alcohol concentration is high, the ignition timing for the case where gasoline is used as the fuel is spark advance corrected to improve fuel consumption.

Because with the ignition timing of an internal combustion engine using gasoline as the fuel, differences between regular and high octane gasoline are corrected, learned, and set according to knock control and a plurality of ignition timings are set according to valve timings, a plurality of basic ignition timings of the internal combustion engine using gasoline as the fuel are memorized. Thus, when ignition timings according to alcohol concentration are set further in correspondence to the plurality of basic ignition timings for the case of using gasoline as the fuel, loads placed on a memory unit and a processing unit become enormous. By performing spark advance correction by adding the correction amount based on the ignition timing in the case of using gasoline as the fuel, the ignition timing can be set according to the alcohol concentration without increasing the load on the memory unit and the processing unit.

The internal combustion engine controller according to the present invention decreases the fuel consumption while improving the exhaust gas performance in an internal combustion engine operable by an alcohol-containing fuel.

The present invention can be used in an industrial field of a controller for an internal combustion engine operable by an alcohol-containing fuel.

What is claimed is:
1. A controller of an internal combustion engine operable by an alcohol-containing fuel, the controller comprising:

an alcohol concentration detecting unit that detects an alcohol concentration of the alcohol-containing fuel;

an operation region setting unit configured to set a stoichiometric operation region, in which a target air-fuel ratio is stoichiometric, to be larger as the alcohol concentration, detected by the alcohol concentration detecting unit, becomes higher than a predetermined value; and a feedback controller that feedback controls the air-fuel ratio of the internal combustion engine in accordance with the operation region set by the operation region setting unit, and wherein the operation region setting unit is configured to set, in the operation region in which the feedback controller operates, a timer region, as a part of the enlarged stoichiometric operation region, the timer region in which operation by the feedback control is continued for a predetermined time during which a catalyst provided in an exhaust passage of the internal combustion engine does not overheat and in which, the feedback control is executed so that in a rich operation region, in which the target air-fuel ratio is a rich air-fuel ratio, the exhaust air-fuel ratio of the internal combustion engine becomes stoichiometric.

2. The controller according to claim 1, wherein
the operation region setting unit is configured to determine a boundary value of an enlarged stoichiometric region as a weighted average of a boundary value of the stoichiometric operation region during use of a fuel not containing alcohol and a boundary value of the stoichiometric operation region during use of a fuel containing alcohol, using the alcohol concentration, detected by the alcohol concentration detecting unit, as a weight.

3. The controller according to claim 1, wherein
the feedback controller is configured to control an ignition timing as an operating parameter and increases a spark advance correction amount of the ignition timing as the alcohol concentration, detected by the alcohol concentration detecting unit, becomes higher.

* * * * *